United States Patent [19]

Dietrich, Sr. et al.

[11] Patent Number: 4,548,277
[45] Date of Patent: Oct. 22, 1985

[54] SPRING RESET MECHANISM FOR TILLAGE TOOL

[75] Inventors: William J. Dietrich, Sr., Congerville; Cary L. Sizelove, Eureka, both of Ill.

[73] Assignee: DMI, Inc., Goodfield, Ill.

[21] Appl. No.: 541,529

[22] Filed: Oct. 13, 1983

[51] Int. Cl.[4] .............................................. A01B 61/04
[52] U.S. Cl. ..................................... 172/265; 172/705
[58] Field of Search ............... 172/264, 269, 261, 265, 172/266, 267, 268, 705

[56] References Cited

U.S. PATENT DOCUMENTS

| | | | |
|---|---|---|---|
| 3,191,688 | 6/1965 | Morkoski | 172/269 |
| 3,202,223 | 8/1965 | Fulton | 172/264 |
| 3,321,027 | 5/1967 | Johnson | 172/264 |
| 4,040,491 | 8/1977 | Dietrich | 172/269 |
| 4,077,478 | 3/1978 | Neukom | 172/267 |
| 4,128,130 | 12/1978 | Green | 172/266 |

FOREIGN PATENT DOCUMENTS

| | | | |
|---|---|---|---|
| 106467 | 1/1939 | Australia | 172/264 |
| 207039 | 2/1956 | Australia | 172/265 |

Primary Examiner—Richard J. Johnson
Attorney, Agent, or Firm—Emrich & Dithmar

[57] ABSTRACT

A spring reset mechanism for a ground engaging tool includes a four-bar linkage mounting for the tool. A fixed cam surface is mounted to one of the links and a roller cam carried by a guide link is spring-biased against the cam surface to urge the tool into its working position. As the tool nears the limit of its raised position, a recess in the cam surface receives the roller to reduce the rate of spring compression and enable the tool to clear an obstruction without substantially increasing the resistance force. Further, as the tool raises, the resistance moment arm decreases which further facilitates clearing a large obstruction. The reset force characteristics may be changed by simple and economical design changes.

7 Claims, 3 Drawing Figures

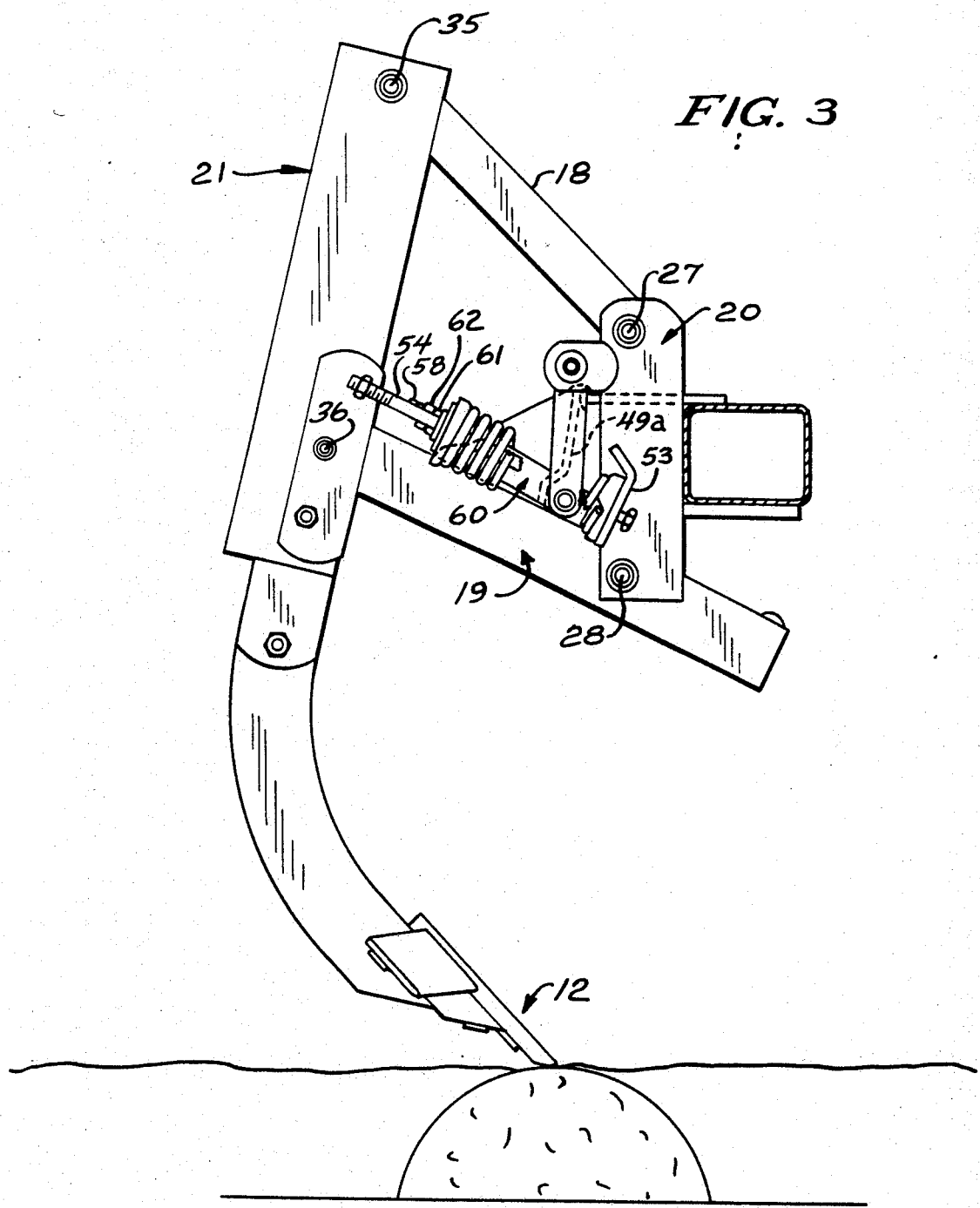

SPRING RESET MECHANISM FOR TILLAGE TOOL

BACKGROUND AND SUMMARY

The present invention relates to agricultural machinery; and more particularly, it relates to a spring reset mechanism for enabling a ground-engaging tool to raise upon striking an obstacle, elevate above the obstacle to clear it, and then reset to its original working depth automatically and under predetermined force provided by a spring mechanism.

The spring mechanism of the present invention may be adapted to a wide range of agricultural tools, including tillage tools such as moldboard plows, chisel plows and field cultivator shanks; but it is also adaptable for other ground-engaging tools such as fertilizer knives, ridging devices, furrow-openers or the like.

With the greater power and higher operating speeds of modern agricultural tractors, some prior mechanisms for permitting ground-engaging tools to clear obstacles such as rocks, have become unsuitable for field use. Such mechanisms, which are broadly referred to as reset mechanisms, may be classified into three general types. One type, called a trip mechanism, has a threshold force which is determined by a mechanical device or arrangement, perhaps including a detent, which requires that the threshold force be exceeded even before the mechanism will allow the tool to elevate. Obviously, when the tool first encounters increased resistance, the resistance could be caused either by a change in soil conditions or engagement with a rock. Mechanisms which employ a mechanical threshold which must be overcome before the tool can be elevated may result in breakage because of the extremely quick reaction time that must be provided and the fact that the mechanical mechanism must release after the tripping force is encountered before the tool can clear the obstruction. Once the trip force is exceeded, obviously, it is desirable to have the mechanism react very quickly and without a substantial increase in resistance force. A further disadvantage of mechanical trip mechanisms is that the farmer must stop the tractor and reset the mechanism manually after it has tripped.

A second type of reset mechanism is called an automatic reset mechanism. In this type of protective mechanism, a mechanical device may define the trip threshold as with the first type described above, but a spring is used to reset the mechanism so the farmer does not have to do it individually.

A third type of protective reset mechanisms includes spring cushion devices. These safety mechanisms generally include a threshold force that is determined by the preload on one or more springs, and once it is overcome, the springs compress. These devices enable a quick reaction time for the mechanism to clear obstructions, but designs of this type can suffer from one or more disadvantages. One disadvantage might be that the reset force continues to increase at the same rate as the tool is elevated. This is caused primarily by the fact that the mechanism continues to compress the spring at the same rate for the entire vertical displacement of the tool. Another problem in spring cushion mechanisms is that if the preload is not properly adjusted, the entire machine may not function properly. If the preload, for example, is too low for soil conditions, then the mechanism will float—that is, during operation, individual devices will compress even though an obstruction has not been encountered. When this happens, the entire frame of the implement can vibrate, resulting in a staggered motion or "duck walking" of the implement and improper operation.

SUMMARY OF THE INVENTION

The present invention provides improvements to the type of reset mechanism disclosed in U.S. Pat. No. 4,040,491 of William J. Dietrich, Sr. The reset mechanism for a ground-engaging tool includes upper and lower links for mounting an upright member carrying the tool to an upright member mounted to the implement frame. Thus, the mechanism includes a four-bar linkage mounting for the tool shank.

A cam surface is fixedly mounted to the lower, generally horizontal link; and it includes a first portion for operating under normal conditions, and a second release portion for substantially reducing the rate of increase in reset force when high clearance is required.

A roller cam is mounted on a guide link which, in turn, is pivotally mounted to the forward upright link of the four-bar linkage. The guide link is spring-biased to urge the roller cam against the fixed cam surface to force the tool into the working position. The structure is designed so that the rate of spring compression and the resistance moment arm (both of which determine the increase in reset force) reduce continuously as the tool elevates. As the tool nears the limit of its raised position, the roller cam enters the release recess in the cam surface to reduce even further the rate of spring compression and enable the tool to clear higher obstructions without substantially increasing the resistance force.

The primary advantages of the present invention over the mechanism disclosed in the above-identified patent are its simplicity, reliability, greater ease of manufacture, lower cost, and the ability to quickly and easily adjust the preload on the reset springs. The latter is accomplished simply by turning a nut down on a bolt. This enables the operator to adjust the reset mechanism for varying soil conditions to maintain the machine in proper operating condition.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

FIG. 3 is a view of similar to FIG. 1 showing the tool raised to clear an obstacle.

DETAILED DESCRIPTION OF THE DRAWING

Figure 1:
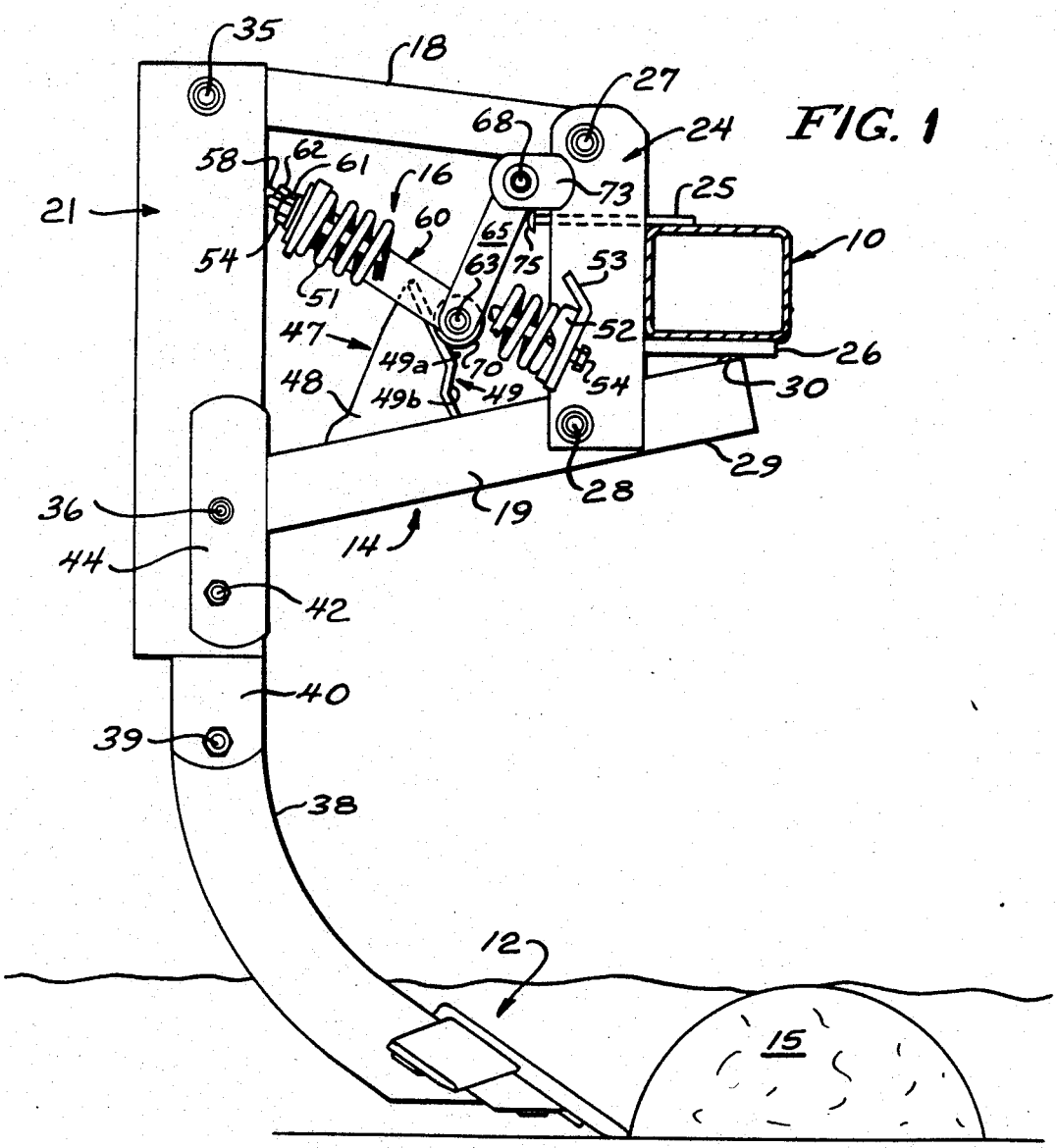
FIG. 1 is a right side view of a spring cushion reset mechanism incorporating the present invention and shown in the operating position, with portions broken away for clarity.

Referring first to FIG. 1, reference numeral 10 generally designates a mounting bar which is part of an implement frame on which individual ground-engaging tillage tools, such as the chisel plow point 12 are mounted. The overall implement frame may be integral (that is, supported by the three point hitch of the tractor) or it may be of the pull type which would have its own support wheels. The details of the frame are not important to an understanding of the invention.

The tool 12 is mounted to the mounting bar 10 by means of a linkage generally designated 14. The linkage 14, as will be understood from the subsequent description, mounts the tool 12 while providing a four-bar linkage motion permitting the plow point to be raised from the normal use position shown in FIG. 1 to the elevated position of FIG. 3 when an obstacle such as the rock diagrammatically illustrated as 15 is encountered. A spring assembly generally designated 16 provides both a threshold force which must be overcome before the plow point can be elevated at all from the use position, and a reset force for urging the plow point back to the use position after the obstacle is cleared.

Turning now to the details of the four-bar linkage 14, it includes a generally horizontal upper link 18, a generally horizontal lower link 19, a forward upright member 20, and a rear upright member 21 which supports the plow point 12, as will be further described below.

Figure 2:
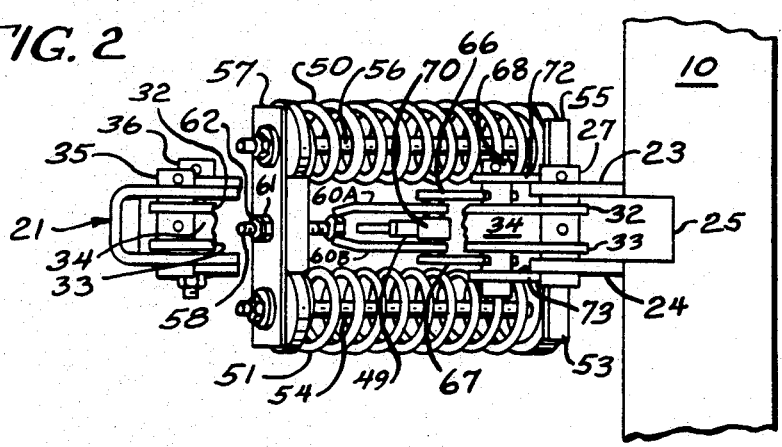
FIG. 2 is a top view of the apparatus of FIG. 1 with portions broken away and the implement frame in fragmentary form.

As best seen in FIG. 2, the forward upright 20 comprises first and second side plates 23, 24 which are spaced apart and welded to a horizontal mounting bracket 25 which, in turn, is welded to the top of the mounting bar 10. A similar lower mounting plate is designated 26 in FIG. 1.

A pivot pin 27 is mounted between the plates 23, 24 and toward the top of the upright 20, and it pivotally connects the forward end of the upper link 18 to the upright 20. A similar pin 28 is similarly mounted to the upright 20 for connecting the lower link 19 to it. However, the lower link 19 includes a forward extension as at 29, at the top of which a stop member 30 is affixed. The lower limit of the plow point 12 is reached when the stop member 30 engages the bottom surface of the plate 26 as seen in FIG. 1.

The upper link 18 is fabricated from three pieces and has a cross-section in the form of an H, including first and second side plates 32, 33 and a center plate 34 (see FIG. 2). The rear end of the upper link 18 is pivotally mounted to the upper portion of the rear upright 21 by means of a pin 35. As best seen in FIG. 2, the rear upright 21 is formed in an U-shaped channel. A pin 36 similarly mounts the rear of the lower link 19 to the lower portion of the rear upright 21. The plow point 12 is mounted to a shank 38 which, in turn, is bolted at 39 to lower extensions welded to the channel upright 21. One of these extensions is seen at 40 in FIG. 1, and a similar extension is provided on the other side of the shank 38. The upper portion of the shank 38 is bolted at 42 to the lower portion of the channel upright 21. The bolt 42 is a shear bolt to prevent destruction of the structure should an obstruction be encountered such as a shelf rock. The channel upright 21 is further strengthened in the area of the pivot connection 36 and shear bolt 42 by means of side plates, one of which is shown at 44.

For strength, the lower link 19 is also a weldment including two side plates, an upper plate and a lower plate so that it has a generally rectangular cross-section. A cam generally designated 47 is fixed to link 19, and it includes a brace plate 48 welded to the top of link 19 and a cam track 49.

The spring assembly 16 includes first and second coil springs 50, 51. The lower end of spring 51 is received on an end mount 52 which is seated on a base plate 53 welded to the outboard side of the right side plate 24 of the forward upright 20, as seen in FIG. 1. The base plate 53 is apertured to receive a spring bolt 54 which extends along the axis of coil spring 51. The lower portion of spring 50 is similarly mounted to a base plate 55 which is welded to the outboard surface of side plate 23, as best seen in FIG. 2. A spring bolt 56 similarly extends along the axis of the spring 50; and spring bolts 54, 56 extend through an upper support plate 57 as seen in FIG. 2.

A link 60 comprising side straps 60A and 60B is mounted to the center of the spring support plate 57. The straps are welded to the head of a bolt 58 which is secured to the spring support plate 57 by means of a nut 61 and a jam nut 62. As will be clear from further description, adjusting the bolt 58 relative to the spring support plate 57 determines the preload on the reset mechanism.

The lower free ends of the link 60 are rotatably received on a pin 63 (FIG. 1) which is mounted to a guide link 65. Referring to FIG. 2, guide link 65 includes first and second side plates 66, 67, the upper portions of which are welded to a pin 68. A roller cam 70 is also mounted on the pin 63 held by the lower portions of the plates 66, 67. The upper pin 68 is journaled in mounting brackets 72, 73 welded respectively to the side plates 23, 24 of the forward upright 20.

Referring again to FIG. 1, it will be observed that the lower link 19 (i.e., a line drawn between the axes of rotation of pins 28 and 36) extends rearwardly and slightly downwardly, whereas the upper link 18 extends rearwardly and slightly upwardly. This configuration enables the initial release motion of the plow point to have a rearward component because the link 19 rotates clockwise about pin 28 and must pass through the horizontal, whereas link 18 rotates clockwise about pin 27 and has already passed through the horizontal. In other words, as the pin 36 moves upward from the normal use position it moves slightly rearwardly at the same time; whereas when pin 35 raises, it moves slightly forwardly immediately. This initial rearward component of displacement of the point is disclosed in my U.S. Pat. No. 4,040,491 and is advantageous to causing the unit to trip.

In operation, then, the farmer sets a preload on the springs 50, 51 by adjusting the nut 61 on bolt 58, and then tightening jam nut 62. As the nut 61 is lowered on bolt 58, the spring support plate 57 compresses both springs together by bringing them toward the roller cam 70, it being appreciated that the lower ends of the springs are fixed by base plates 53, 55.

The preload force of the springs exerts a tension in the tension link 60; and that force is transmitted through roller cam 70 to the cam surface 49, and creates a torque tending to rotate the lower link 19 counterclockwise about the pin 28.

When the chisel point 12 encounters resistance sufficient to overcome the predetermined preload force of the reset mechanism, the chisel point will begin to move upwardly and rearwardly from its initial position relative to the frame 10. Because the upper and lower links 18, 19 are not horizontal, and because of the four-bar linkage effect which has been described, the links 18, 19 will rotate clockwise about their respective pivots 27, 28. Rotation of the lower link 19 will cause cam 47 to urge the oam roller 70 in an arc about pin 68 because the cam roller is mounted to guide link 65. This, in turn, will cause the tension link 60 to urge the spring support plate 57 downwardly and toward the front of the implement, further compressing the springs 50, 51. Thus, initially, the resistance or reset force increases as the springs compress. The cam track 49 has a first or use portion 49A, and a second or release portion 49B which offset relative to the use portion 49A.

Before discussing the operation of the mechanism in further detail, there are two effects which should be more fully understood. The purpose of these effects is to apply the proper downward force on the plow point at the proper time. When the plow point is in the normal use position shown in FIG. 1, as already mentioned, there is a desire to have a preload force holding the plow point in that position. There is, however, in addition to the preload force, the natural tendency caused by the shape of the plow point to dig into the ground. As the plow point is raised slightly, it is desirable to add a reset force to the preload force to reset the plow. However, as the plow elevates toward the surface of the soil it is desirable to reduce the rate of reset force increase. The reasons for this are first, when the plow point is elevated toward its highest clearance, it is desirable to facilitate clearing of an obstruction without substantial increase in reset force, and secondly, if the plow point is near the surface of the soil, a lesser force is required to place the plow into the soil due to the shape of the plow point and the weight of the shank and other structure. Thus, to accomplish these desirable functions, two effects take place. A first effect is that the rate of compression of the springs decreases continuously as the plow point elevates. In other words, as the plow point raises equal increments above the normal use position, the amount of spring compression decreases. This result is achieved by the cooperative relationship of the guide link 65 and the location of its pivotal connection 68, and the location and shape of the cam track 49. In other words, the location of the roller 70 is defined not only by the shape of the cam track, but by the guide link 65 and its pivotal mounting 58. This effect is even further amplified by providing the offset cam portion 49B as the plow point is raised approximately one-half the distance between the normal operating depth and the surface of the soil.

The second effect is the reduction in the resistance moment arm. The total resistance force is determined not only by the force generated by the spring, but the resistance moment arm through which that force is applied to the plow tip. It will be appreciated by persons skilled in the art that the resistance moment arm decreases continuously throughout the operation of the illustrated structure as the cam roller 70 is forced toward the pivot location 28 during raising of the plow point.

Both of these effects combine to provide the desired result of not substantially increasing the reset force as the plow tip elevates. A principal advantage of the present invention, in fact, is that both of these effects which are, to some extent, inherent in the above-identified patent, are achieved in a much more economical, reliable and simple structure than is illustrated in that patent; and the reset force characteristic may readily and economically be changed—for example, by changing the location of the pivot 68. In the prior structure, to achieve a design change, the planetary cam had to be changed, and that is an expensive structure and more complicated than the present improvements.

As the link 19 rotates clockwise, the cam roller 70 moves along the normal use portion 49A of cam track 49, compressing the springs and increasing the reset force, as mentioned. When the chisel point is approximately half way out of the ground, the cam roller 70 enters the release portion 49B of the cam track 49. The release portion 49B is shaped relative to the normal use portion 49A such that for further elevation of the chisel point 12, the rate of spring compression will be decreased. This has the effect of permitting the chisel point to be elevated to the uppermost clearance position of FIG. 3 without further substantial increases in the reset force. On the other hand, during re-entry, sufficient reset force is available to enable the chisel point to enter the ground, and after entering the ground, when the cam roller 70 again operates along the use portion 49A of the cam track 49, sufficient reset force is available to drive the chisel point to its intended operating depth.

In the upper limit position of FIG. 3, a stop member 75 welded to the rear of the upper mounting plate 25 engages the upper portion of the cam track 49 to limit the elevation of the chisel point.

Having thus disclosed in detail a preferred embodiment of the invention, persons skilled in the art will be able to modify certain of the structure which has been illustrated and to substitute equivalent parts or components for those disclosed, while continuing to practice the principle of the invention; and it is, therefore, intended that all such modifications and substitutions be covered as they are embraced within the spirit and scope of the appended claims.

We claim:

1. In a spring reset mechanism for a ground-engaging tool carried by an implement frame and including linkage means for mounting said tool to said frame and for moving said tool between a normal use position and an elevated clearance position, the improvement comprising: said linkage means including an upright forward link member mounted to said frame, generally horizontal lower and upper links pivotally mounted to said forward link member at respective lower and upper locations, and an upright rear support link member carrying said tool and pivotally mounted to the rear portions of said lower and upper links; a cam member defining a cam surface; means for fixedly mounting said cam member to one link of said linkage means; guide link means pivotally mounted to another of said links of said linkage means and including a roller; and spring means for biasing said guide link such that said roller is urged into contact with said cam surface; said linkage means, mounting means, cam surface and guide link means being constructed and cooperatively arranged to continuously reduce the rate of compression of said spring means and continuously to move said roller along said cam surface to reduce the resistance moment arm of said reset mechanism as said tool is raised from the normal use position.

2. The apparatus of claim 1 wherein said spring means includes at least one coil spring, said apparatus further comprising means responsive to the motion of said roller along said cam surface as said tool rises for compressing said coil spring and characterized in that said cam surface and guide link means define the path of said roller and the rate of spring compression and the resistance moment arm of said reset mechanism, whereby varying said path will change the rate of spring compression and the length of said moment arm.

3. The apparatus of claim 2 further comprising adjustable means for preloading said spring means, whereby said preload force of said spring means must be overcome before said linkage means will permit said tool to be elevated above the use position.

4. The apparatus of claim 3 further comprising means for mounting one end of said spring means to one of said links of said linkage means; a base plate engaging the other end of said coil spring; a tension link connected between said base plate and said roller for transmitting the preload and compression forces of said spring means to said roller to urge the same along said fixed cam surface.

5. The apparatus of claim 4 further comprising a bolt connected at one end to said tension link and extending through said spring base plate; and a nut threadedly received on said bolt for attaching the same to said base plate, whereby tightening of said nut on said bolt increases the preload force of said spring means.

6. The apparatus of claim 5 further comprising means for fixing the head of said bolt to said tension link whereby said preload may be adjusted simply by turning said nut.

7. The apparatus of claim 1 wherein said cam track defines a first use portion defining a generally linear path and a second release portion inclined relative to said use portion for receiving said roller cam after said tool has elevated a predetermined height to decrease further the compression rate of said spring for additional elevation of said tool.

* * * * *